United States Patent [19]

Szabo

[11] Patent Number: 5,277,402
[45] Date of Patent: Jan. 11, 1994

[54] QUICK CONNECT FLUID COUPLING WITH CHECK VALVE

[75] Inventor: George Szabo, Ortonville, Mich.

[73] Assignee: ITT Corporation, New York, N.Y.

[21] Appl. No.: 773,175

[22] Filed: Oct. 8, 1991

[51] Int. Cl.⁵ .............................................. F16L 37/40
[52] U.S. Cl. .................. 251/149.6; 285/321; 285/921
[58] Field of Search .................. 251/149, 149.6, 149.5, 251/149.1; 285/321, 921

[56] References Cited

U.S. PATENT DOCUMENTS

| | | | |
|---|---|---|---|
| 2,327,611 | 8/1943 | Scheiwer | 251/149.6 X |
| 2,412,685 | 4/1944 | Hoffman et al. | 284/19 |
| 2,730,382 | 1/1956 | DeMastri | 251/149.6 X |
| 3,177,018 | 1/1963 | Goodwin | 285/277 |
| 3,567,175 | 3/1971 | Sciuto | 251/149.6 |
| 3,698,742 | 11/1970 | Jones et al. | 251/149.6 |
| 3,873,062 | 3/1975 | Johnson et al. | 251/149.6 |
| 3,995,659 | 12/1976 | Cantore | 251/149.6 X |
| 4,376,359 | 3/1986 | Oetiker | 251/149.6 |
| 4,423,892 | 1/1984 | Bartholomew | 285/319 |
| 4,470,575 | 9/1984 | Stoll | 251/149.6 |
| 4,498,658 | 2/1985 | Mikiya | 251/149.6 |
| 4,819,908 | 4/1989 | Norkey | 251/149.6 |
| 4,825,893 | 5/1989 | Gailey | 251/149.6 X |
| 4,936,544 | 6/1990 | Bartholomew | 251/149.6 |
| 4,979,721 | 12/1990 | Gilbert | 251/149.6 |
| 5,056,756 | 10/1991 | Norkey et al. | 251/149.6 |
| 5,213,376 | 5/1993 | Szabo | 285/39 |

FOREIGN PATENT DOCUMENTS

976125 3/1951 France .

Primary Examiner—Martin P. Schwadron
Assistant Examiner—Kevin L. Lee
Attorney, Agent, or Firm—Dykema Gossett

[57] ABSTRACT

A quick connector adapted for locking engagement with a male member includes a cylindrical body portion open at one end for receiving the male member and a through passage communicating the open end with a conduit receiving adapter at an opposite end. A valve member is located in the passage and is displaceable from a closed position to an open position to establish open communication therethrough in response to engagement of the body portion and male member. Relatively displaceable, at least partially radially coextensive seats are provided to effect axial engagement with the seal in the closed position.

19 Claims, 4 Drawing Sheets

QUICK CONNECT FLUID COUPLING WITH CHECK VALVE

INTRODUCTION

The present invention relates to quick connectors for joining tubular conduit and, more particularly, to quick connectors having means operative to check the flow of fluid therethrough under certain operating conditions.

BACKGROUND OF THE INVENTION

It is desirable in fluid-handling conduits to ensure that the connectors used have their male and female portions properly coupled together. A faulty connector enables an associated host system to leak fluid. This can be particularly disadvantageous when the system is under pressure and the leaking connector expels the pressurized fluid.

In the quick connector field, where male and female portions of the connectors are held together by friction locking connections, it is important that the male and female portions are properly coupled wherein the male portion is manually insertable within the female portion to establish a fluid connection therebetween while a seal assembly fluidically seals the coupling portions together.

U.S. Pat. No. 4,819,908 to Norkey discloses a quick connector which also includes a one-way shut-off valve in the female portion of the coupling. Such couplings retain fluid in the fluid system associated with the female portion of the coupling until the male and female portions are connected together. Upon connection, the valve is moved to its open position and enables fluid to flow in the fluid system. Such fluid couplings are used, for example, in automotive air conditioning systems where the portion of the fluid system associated with the female part of the coupling is charged or pressurized with coolant.

Such previously known quick connect fluid couplings with shut-off valves typically suffer from a number of shortcomings. The "Achilles' heel" of prior art approaches was invariably found in the design of the check valve seal. Some designs, such as in U.S. Pat. No. 2,327,611 to Schweiwer, provided an effectively functioning check valve but at the cost of requiring extremely complex and expensive machined parts and multiple seal elements. Such designs, although useful in some applications, had multi part housings requiring complex assembly and fabrication which was not found to be cost competitive in high volume automotive type applications. Other designs, such as that in U.S. Pat. No. 4,819,908 to Norkey, employed a single seal for two distinct functions, to sealingly engage the male portion of the coupling in the engaged condition and, alternatively, to sealingly engage the check valve member upon removal of the male portion of the coupling. Although this approach eliminated some of the expense of earlier designs, it was prone to leakage in the check valve mode of operation inasmuch as it relied entirely upon radial compression of the seal. It has been found in practice that, such quick connect fittings, when subjected to repeated manual coupling and decoupling, can radially distort the female portion of the assembly carrying the seal, resulting in leakage. Furthermore, the seal can take a compressive set after a period of time in the couple condition, thereby losing its radial resiliency and compromising subsequent use of the check valve feature.

Other designs such as disclosed in U.S. Pat. No. 4,601,497 to Bartholomew disclosed the use of a separate check valve seal. However, such designs subject the seal to shear forces during assembly and during check valve operation which can subsequently result in leakage. Furthermore, in all the aforementioned prior art approaches, the valve member itself tends to be relatively large and heavy and can be prone to sticking, particularly in designs involving thin walled female portions.

BRIEF DESCRIPTION OF THE INVENTION

Accordingly, it is an object of the present invention to provide a quick connector which includes a check valve function which is extremely inexpensive and suitable for high volume applications while simultaneously providing an effective check valve operation. In the broadest sense, a quick connector which is adapted for selective locking engagement with a male member includes a generally cylindrical elongated body portion which is open at one end for receiving the male member and defines a through passage interconnecting the open end and a conduit receiving adapter at an opposite end. The connector includes a valve member disposed for axial displacement within the passage from a closed position wherein the valve member closes the passage to an open position to establish open communication between the open end and adapter in response to engagement of the body portion and male member. Lastly, a generally annular resilient seal means is carried within the passage axially intermediate a first seat defined by said body portion and a second seat defined by said valve member wherein the second seat is at least partially radially coextensive with the first seat to effect axial engagement with the seal means when the valve member is in the closed position. This arrangement provides the advantage of inexpensive and responsive check valve operation which compensates for both wear and minor dimensional irregularlities of the various components.

In the preferred embodiment of the invention, the quick connector includes means to bias the valve member toward the closed position. This arrangement has the advantage of ensuring proper closure of the check valve in systems where relatively low fluid pressures and flow rates are present.

According to another aspect of the invention, the resilient seal means comprises a relatively large annular seal which, is subject to a relatively large degree of compression due to both force supplied by the biasing means (spring) as well as system fluid induced pressure.

According to yet another aspect of the invention, the through passage defined by the elongated body portion has a substantially constant diameter. This arrangement has the advantage of permitting one piece construction of the body portion and permits assembly of the quick connector solely through the open end.

These and other features and advantages of this invention will become apparent upon reading the following specification, which, along with the drawings, describes and discloses a preferred and alternative embodiments of the invention in detail.

A detailed description of the disclosed embodiments makes reference to the accompanying drawings.

Detailed Description of the Preferred and Alternative Embodiments of the Invention Referring to drawing FIGS. 1 through 4, the preferred embodiment of a connector assembly, designated 10, comprises a female connector part 11 and a male connector part 12. The present invention will be described in detail herein below adapted for incorporation within a system of tubular conducts for conducting fluid flow. However, it is contemplated that, in the broadest sense, the present inventive connector could be readily adapted for other applications in view of the present specification.

Figure 1:
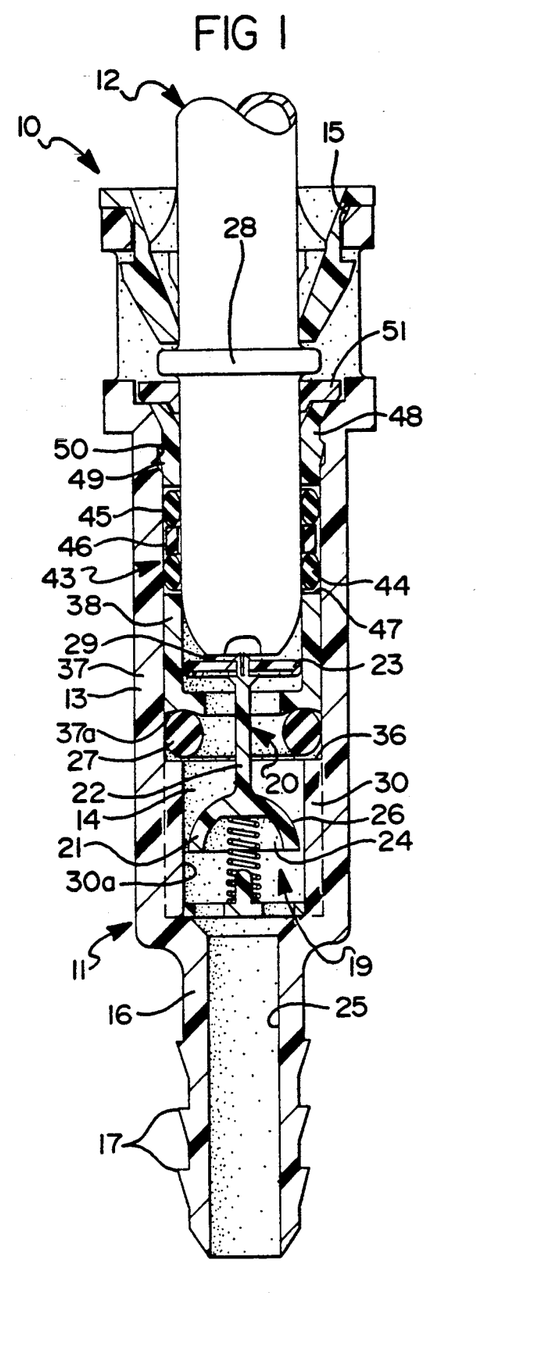
FIG. 1, is a side cross-sectional view of the preferred embodiment of a quick connector in locking engagement with a mating male member.

FIG. 1 illustrates female connector part 11 fully engaged with mating male connector part 12. Female connector part 11 includes a generally cylindrical elongated body portion 13 having a relatively constant diameter bore 14 extending therethrough concentric with the body portion axis of elongation. Bore 14 exits rightwardly from body portion 13 to define an opening 15 for receiving male connector part 12. Body portion 13 transitions leftwardly into a conduit receiving adapter 16 which is generally tubular and through which bore 14 emerges leftwardly. The outer surface of adapter 16 defines a number of circumferential barbs 17 axially spaced therealong for engaging the innerdiameter of a rubber or otherwise suitable conduit (not shown) in the usual manner.

Bore 14 has a substantially constant characteristic diameter with the exception of the portion thereof adjacent opening 15 provided for receiving a retainer 18 in the usual manner. As will be described in detail below, all subcomponents are introduced into bore 14 through opening 15, thereby permitting use of low cost, one piece construction of injection molded plastic or the like.

As best viewed in FIGS. 1 through 4, female connector part 11 includes a check valve shown generally at 19 disposed within bore 14. Check valve 19 includes a generally goblet-shaped valve member 20 including a hemispherical seat portion 21, elongated stem portion 22 and a radially extending guide portion 23. Valve member 20 is disposed concentrically within bore 14, seat portion 21 having a concave recess 24 formed therein facing a passageway 25 formed in conduit receiving adapter 16. Seat and stem portions 21 and 22, respectively, are integrally formed from suitable materials such as injection molded plastic. The outer circumferential surface of seat portion 21 defines a curved annular seat 26 which sealingly engages a fixed resilient annular seal 27 such as a rubber O-ring within bore 14 to selectively check the flow of fluid through bore 14.

Figure 2:
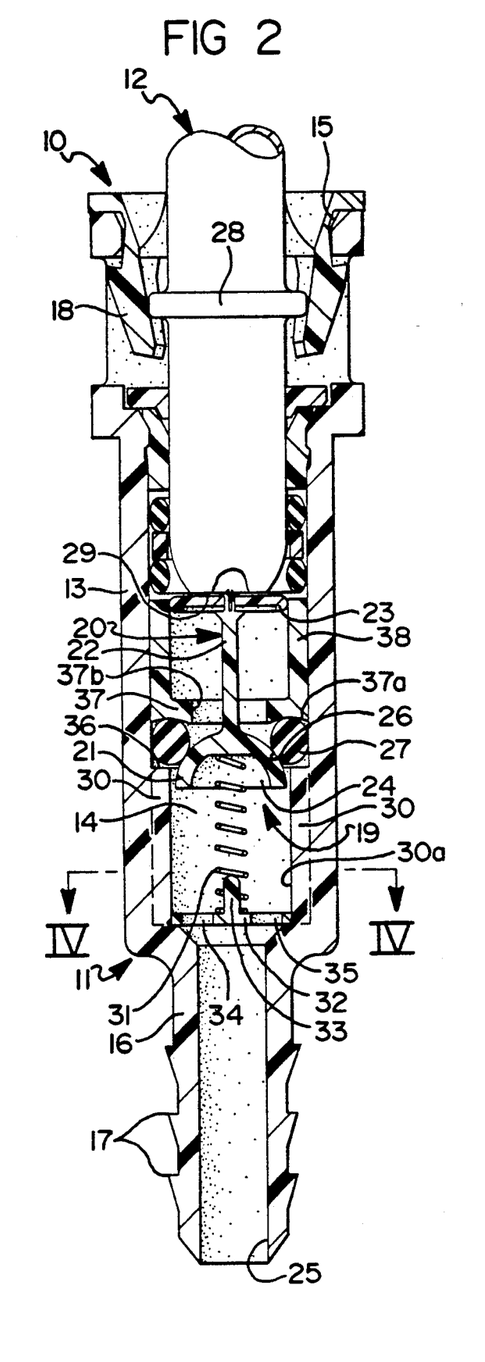
FIG. 2, corresponds with FIG. 1, but with the male member in a released position.

Thus configured for high strength, light weight and minimal cross sectional area (flow resistance), valve member 20 is displaceable from a first or closed position illustrated in FIG. 2 wherein seat 26 contacts seal 27 to entirely close off communication through bore 14, to a second position illustrated in FIG. 1 wherein valve member 20 is displaced leftwardly to establish open communication through bore 14. The valve member 20 is displaced from the first to the second position in response to full insertion of male connector part 12 within female connector part 11 and interlocking of a radially outwardly directed circumferential flange 28 formed on male part 12 with retainer 18 in the usual manner. Once engaged, a leading edge 29 of male member 12 contacts guide portion 23 to displace valve member 20 to its open position.

As best viewed in FIGS. 1 through 4, a plurality of circumferentially spaced, axially elongated, radially inwardly directed guide ribs 30, formed on the innerdiameter of body portion 13 within bore 14 serve to radially guide seat portion 21 of valve member 20 while permitting relatively free axial displacement thereof. A helical compression spring 31 disposed within bore 14 bares leftwardly against a fixed abutment member 32 and rightwardly against seat portion 21 within recess 24 to continuously bias valve member 20 rightwardly. A locater pin 33 maintains the illustrated axial alignment of spring 31. Abutment member 32 is press fit with surfaces 30a of guide ribs 30 within bore 14 and includes large axial passageways 34 and 35 openly fluidly interconnecting bore 14 with passageway 25.

Figure 3:
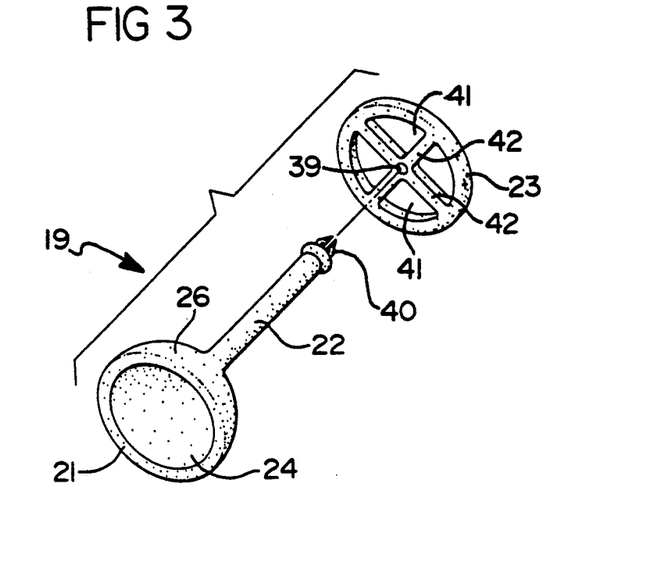
FIG. 3, is an exploded perspective view of a valve member from the quick connector of FIG. 1 on an enlarged scale.
Figure 4:
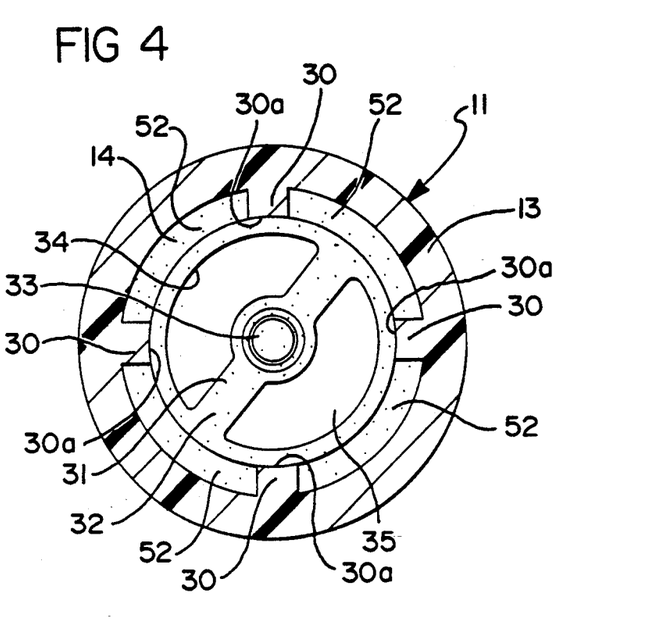
FIG. 4, is a cross-sectional view of the preferred quick connector taken on line IV—IV of FIG. 2 on an enlarged scale.

Seal 27 is axially restrained from leftward displacement by abutting surfaces 36 formed by the ends of guide ribs 30 and from rightward displacement by a radially inwardly extending circumferential flange 37 integrally formed with a tubular guide member 38 press fit within bore 14. Flange 37 has a concave circumferential groove 37a formed therein nestingly embracing an adjacent portion of seal 27 to help position the seal and to prevent it from distorting or flowing radially inwardly during high pressure conditions when the check valve 19 is closed. The radially innermost edge of flange 37 defines a large flow passage 37b which has a characteristic diameter substantially equaling the innerdiameter of seal 27. The innerdiameter of guide member 38 forms a loose slip fit with the outer circumferential edge of guide portion 23 of valve member 20. Guide portion 23, as bested viewed in FIG. 3, is shaped like a spoked wheel and includes a central bore 39 adapted for receiving a snap fitting 40 formed on the end of stem portion 22 distal seat portion 21 of valve member 20. Upon insertion of snap fitting 40 within bore 39, guide portion 23 is axially restrained in assembly for displacement with seat and stem portions 21 and 22, respectively of valve member 20 but is free to rotate with respect thereto and is further free for limited swiveling/rocking to provide for parallel alignment between guide portion 23 and the leading edge 29 of male part 12 when they are in abutting relationship to ensure that valve member 20 is displaced only axially by male part 12. Apertures 41 formed between adjacent spokes 42 of guide portion 23 permit free fluid communication from the open end 29 of male part 12 to bore 14.

In the coupled condition illustrated in FIG. 1, a seal assembly 43 comprising first and second O-rings 44 and 45, respectively, and an intermediate spacer 46 provide a fluid tight seal between the outer circumferential surface of the male part 12 and the innerdiameter of body portion 13 of female part 11. Seal assembly 43 is axially restrained in its illustrated position between a radial end surface 47 of guide member 38 and a tubular retainer 48 press fit within bore 14 and including an outwardly directed circumferential rib 49 snap fit within a mating circumferential recess 50 in the inside diameter of body portion 13. Lastly, an annular abutment member 51 is press fit within bore 14 to provide a stop, to limit the axial inward travel of male part 12. The present invention thus ensures that neither seal (27 and 43) is displaced during insertion of male part 12. Furthermore, seal 27 has a section that substantially exceeds that of O-rings 44 and 45 to allow use of a seal assembly 43 of substantially conventional design while permitting a large degree of axial travel of valve member 20 while it retains continuous sealing engagement with seats 26 and 37a.

In application, when the male and female parts 12 and 11, respectively, are fully engaged as illustrated in FIG. 1, valve member 20 is retained in the open position to provide a free and relatively unrestricted flow of fluid through male part 12, bore 14 and passageway 25. The provision of large arcuate bore segments 52 circumferentially interspacing guide ribs 30 as well as the small cross-section of stem portion 22 combined with the relatively larger internal dimensions of seal 27 and flow passage 37b, provide relatively unrestricted flow through connector assembly 10. Preferably, with valve member 20 in its position illustrated in FIG. 1, the effective cross-section of the flow passage through connector assembly 10 remains as close to constant as possible.

The overall shape of valve member 20, including the provision of snap fitting 40 permits a small degree of radial freedom of play whereby upon closing of check valve 19, valve member 20, if slightly radially skewed, will react against seal 27 in a self-centering manner to ensure complete sealing engagement therebetween which is relatively independent of wear. Additionally, seat portion 21 is dimensioned to be at least partially radially coextensive with the fixed seat 37a formed by flange 37 to ensure a substantial degree of axial compression of seal 27 as well as a degree of radially compression thereof upon closure of valve member 20. The use of a relatively large cross-section seal 27 in combination with a seat portion 21 which applies a significant degree of axial as well as radial compression thereupon has been found to provide an extremely effective seal, even in high volume low cost applications. The axial length of stem portion 22 is selected to preferably exceed the nominal diameter of bore 14 to enhance stability of valve member 20 and to minimize the chance of it jamming within bore 14 and to permit a more laminar flow of fluid when in the open position.

Figure 5:
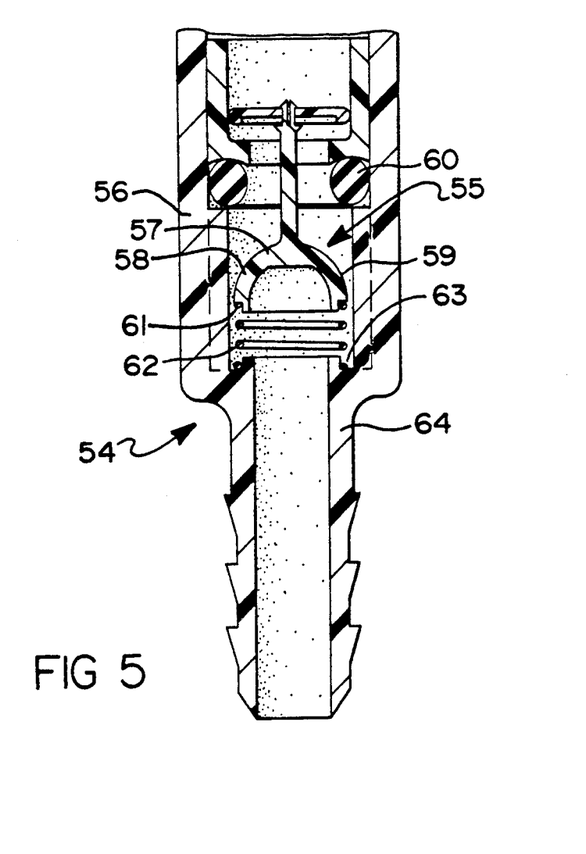
FIG. 5, is a fragmentary cross-sectional view of first alternative embodiment of the quick connector, illustrating the use of a large diameter return spring.

Referring to FIG. 5, a first alternative embodiment of the invention is illustrated which is identical in form and function to the preferred embodiment described hereinabove with the following exceptions. A female connector part 54 has a check valve 55 disposed in a body portion 56 thereof. Check valve 55 includes a valve member 57 defining a hemispherical seat portion 58 forming a seat 59 which selectively mates with an annular resilient seal 60 as described hereinabove. Seat portion 58 has a circumferential notch 61 formed therein for receiving one end of a helical compression spring 62. The other end of spring 62 bares leftwardly within an axially rightwardly opening circumferential groove 63 formed in body portion 56 near a point of transition to a conduit receiving adapter 64.

Spring 62 tends to bias valve member 57 from the open position (illustrated) toward the closed position. The large diameter spring 62 can apply substantially higher force than spring 31 of the embodiment of FIG. 1 and can thus be employed for higher pressure applications. Furthermore, the embodiment of FIG. 5 eliminates the need for a separate abutment member 32 described in connection with the embodiment of FIGS. 1 through 4.

Figure 6:
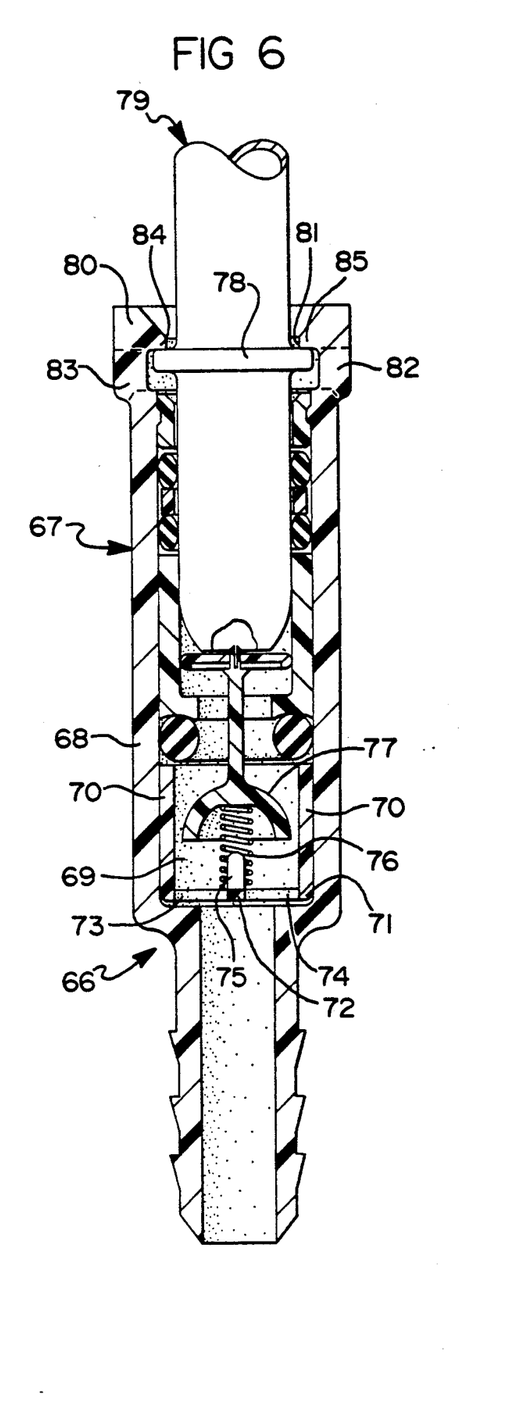
FIG. 6, is a cross-sectional view of a second alternative embodiment of the quick connector of FIG. 1 illustrating a squeeze-to-release feature.

Referring to FIG. 6, a second alternative embodiment of the invention is illustrated as a connector assembly 66 which differs in form and operation from the embodiment as described with respect FIGS. 1 through 4 in two major respects. Connector assembly 66 includes a female connector part 67 with a body portion 68 defining a bore 69. Rather than employing integral guide ribs 30 as described hereinabove, female connector part 67 employs a separate, one piece guide cage comprising three or more axially directed elongated circumferentially spaced guide members 70 which are joined at their leftwardmost end by a circumferential ring 71. A spoke 72 bisects bore 69 into two passageways 73 and 74 to support a locating pin 75 which centers and supports one end of a helical compression 76. The other end of spring 76 bares against a valve member 77 urging it from its illustrated open position towards a closed position. This structure allows the forming of female connector part 11 with a substantially constant diameter bore 69 for manufacturing ease. Guide members 70, ring 71, spoke 72 and locating pin 75 can be integrally injection molded as a single piece and press fit within bore 69 during the assembly process.

Secondly, the right-hand most end of body portion 68 includes a squeeze-to-release type engagement mechanism with a radially outwardly extending abutment surface 78 formed on a mating male connector part 79. The squeeze-to-release type feature is described in detail in a related co-pending application, U.S. Ser. No. 07/753,758, filed by the same inventor and assignee of interest entitled "Squeeze-to-Release Quick Connector" filed on Sep. 3, 1991, now U.S. Pat. No. 5,213,376 the specification of which is incorporated herein by reference for the sake of brevity.

Female connector part 67 includes an annular retaining ring 80 which is disposed concentrically with body portion 68 and axially spaced slightly from an open end 81 thereof. Two circumferentially opposed generally parallel axially extending webs 82 and 83 interconnect the retaining ring 80 and body portion 68. Two circumferentially spaced detents 84 and 85 extend inwardly from the retaining ring 80 to capture abutment surface 78 to effect engagement between parts 67 and 79. Release of connector assembly 66 is affected by manually squeezing retaining ring 80 through a line of action rotationally offset approximately 90 degrees from the position of detents 84 and 85, i.e. directly into and out of the plain of the paper containing FIG. 6. This feature eliminates the need for a separate retainer and simplifies fabrication of body portion 68.

Figure 7:
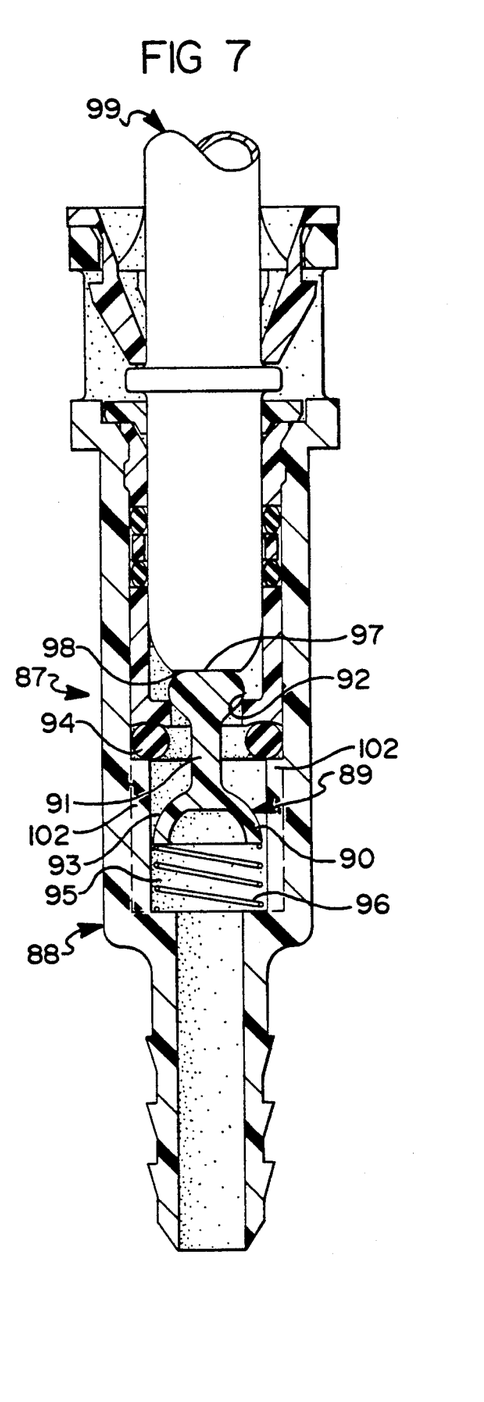
FIG. 7, is a cross-sectional view of a third alternative embodiment of the quick connector of FIG. 1 illustrating a valve member of alternative configuration.
Figure 8:
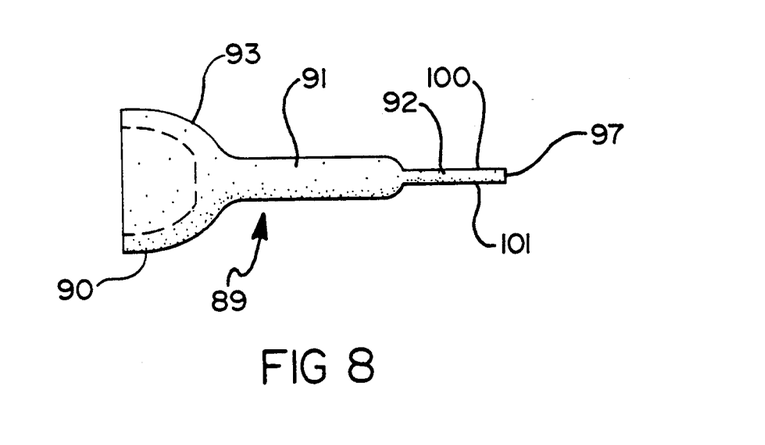
FIG. 8, is a top view of the valve member from the quick connector of FIG. 7 on an enlarged scale.

Referring to FIGS. 7 and 8, a further embodiment of the present invention is illustrated. In this case, a connector assembly 87 includes a female connector part 88 which is substantially identical to that described with relation to FIG. 5 hereinabove with the exception of the shape of a valve member 89 therein. In this case, valve member 89 is a one piece integrally formed structure including a hollow hemisperical seat portion 90, an elongated stem portion 91, and a guide portion 92. As in the cases hereinabove, seat portion 90 defines a seat 93 which engages a resilient annular seal 94 fixedly carried within female connector part 88 to effect selective opening and closure of a bore 95 extending therethrough. A helical spring 96 biases valve member 89 from its open (illustrated) position towards its closed position. Guide portion 92 forms a generally fishtail configuration defining a leftwardly facing abutment surface 97 configured to abut a leading edge 98 of a mating male connector part 99 engaging female part 88 to displace valve member 89 to its open position. Generally parallel laterally opposed surfaces 100 and 101 of guide portion 92 provide clearance for fluid flow through the open end 98 of male part 99. The rounded contour of abutment surface 97 provides a degree of swivel or rocking freedom to effect positive engagement between abutment surface 97 and leading edge 98 of male connector part 99 to ensure straight, axial displacement thereof. Seat portion 90 of valve member 89 is guided by a number of axially elongated radially inwardly directed guide ribs 102 which are integrally formed within bore 95 to keep valve member 98 centered as described hereinabove while permitting fluid flow there around when in the open position.

It is to be understood that the invention has been described with reference to specific preferred embodiments which provide the features and advantages previously discussed and that such embodiments are susceptible of modification as will be apparent to those skilled in the art. Definitionally, by referring to the second seat as being at least partially radially coextensive with the first seat, it is meant that the fixed seat such as surface 37a of flange 37 of FIGS. 1 through 4, extends radially inwardly to a point which is radially inward of the radially outermost extent of seat 26 formed by seat portion 21, thereby assuring a degree of overlap in the radial direction. Preferably, the degree of overlap would be substantial enough to ensure that a substantial portion of the compressive forces applied against resilient seal 27 would be axially directed. Accordingly, the foregoing is not to be construed in a limiting sense.

What is claimed is:

1. A quick connector adapted for selective locking engagement with a male member having a male member open end, said quick connector comprising:

a generally cylindrical elongated body portion open at one end for receiving said male member, said body portion defining a through passage interconnecting said body portion open end and a conduit receiving adapter at an opposite end;

a valve member disposed for axial displacement within said passage from a closed position wherein said valve member closes said passage to an open position to establish open communication between said open end and adapter in response to engagement of said body portion and male member, the valve member having a guide element operative to maintain axial orientation of said valve member within said through passage, said guide element being slip-fit within said through passage and said male member open end operative to abut said guide element and to axially displace said valve member to said open position upon locking engagement with said body portion; and generally annular resilient seal means carried within said passage axially intermediate a first substantially rigid seat defined by said body portion and a second substantially rigid seat defined by said valve member, said second seat at least partially radially coextensive with said first seat and cooperating therewith to effect axial compressive engagement with said seal means when said valve member is in said closed position, said second seat axially spaced from said guide element by a dimension that exceeds a nominal diameter of said through passage.

2. The quick connector of claim 1, further comprising means operative to bias said valve member toward said closed position.

3. The quick connector of claim 2, wherein said biasing means comprises a helical spring.

4. The quick connector of claim 1, wherein said seal means is generally toroidal and said second seat is radially tapered toward said open end to effect simultaneous axial and radial compressive engagement of said seal means when said valve member is in said closed position.

5. The quick connector of claim 1, further comprises axially extending guide surfaces formed within said through passage operative to maintain axial orientation of said valve member.

6. The quick connector of claim 5, wherein said guide surfaces are formed on a plurality of circumferentially spaced, radially inwardly directed, axially elongated guide ribs within said through passage.

7. The quick connector of claim 6, wherein said guide ribs are integrally formed with said body portion.

8. The quick connector of claim 7, wherein said guide ribs form part of a generally cylindrical flow guide cage disposed radially intermediate said body portion and said valve member.

9. The quick connector of claim 5, wherein said guide surfaces extend axially a dimension at least exceeding the degree of axially displacement of said valve member between said open and closed positions.

10. A quick connector adapted for releasable locking engagement with a generally tubular male member defining an outwardly extending abutment flange and an open end, said quick connector comprising:

a generally cylindrical, one-piece elongated body portion open at one end for receiving said male member, said body portion defining a through passage registering with said male member open end and interconnecting said body portion open end and a conduit receiving adapter at an opposite end for the flow of fluid therethrough;

a rapidly inwardly directed substantially rigid seat carried by said body portion within said through passage facing said conduit receiving adapter;

an annular resilient seal member disposed concentrically within said through passage axially adjacent said seat;

a valve member disposed for axial displacement within said passage from a closed position wherein said valve member, coacting with said seat and seal member, closes said through passage to an open position to establish open communication between said body portion open end and said adapter in response to engagement of said body portion and said male member, said valve member defining a radially outwardly extending substantially rigid seating surface disposed axially intermediate said seal member and adapter and facing said body portion open end, said seating surface at least partially radially coextensive with said seat and seal to effect axial compressive engagement with said seal when said valve member is in said closed position, said valve member including a first end portion defining said seating surface and an axially recessed thrust surface for abutting one end of a means for urging said valve member towards said closed position, a second end portion slip fit within said through passage axially spaced from said first end portion by a dimension that exceeds a nominal diameter dimension of said through passage, and an elongated link member interconnecting said first and second end portions for simultaneous axial displacement;

said means for urging said valve member towards said closed position;

means operative, upon locking engagement of said male member and quick connector to displace said valve member from said closed position to said open position;

means for locking said male member and quick connector together in said engaged condition; and means operative to establish a fluid seal between said body portion and said male member, said seal means disposed within said through passage axially intermediate said body portion open end and said seat carried by said body portion.

11. The quick connector of claim 10, wherein second end portion is generally disc shaped end includes at least one axially directed fluid flow opening therein.

12. The quick connector of claim 10, wherein said first and second end portions and link member are integrally formed.

13. The quick connector of claim 10, wherein said valve member is generally goblet-shaped.

14. The quick connector of claim 10, wherein said seal member is nestingly received within an underlying concave annular groove formed in said seat.

15. The quick connector of claim 10, wherein said seal member and seal means are each generally toroidal in shape and said seal member has a characteristic cross-section radial thickness substantially exceeding a characteristic cross-section radial thickness of said seal means.

16. The quick connector of claim 10, wherein said through passage has a substantially uniform internal diameter dimension.

17. A quick connector adapted for selective locking engagement with a male member, said quick connector comprising:

a generally cylindrical elongated body portion open at one end for receiving said male member, said body portion defining a through passage interconnecting said open end and a conduit receiving adapter at an opposite end;

a valve member disposed for axial displacement within said through passage from a closed position wherein said valve member closes said through passage to an open position to establish open communication between said open end and adapter in response to engagement of said body portion and male member;

generally annular resilient seal means carried within said through passage axially intermediate a first substantially rigid seat defined by said body portion an a second substantially rigid seat defined by said valve member, said second seat at least partially radially coextensive with said first seat and cooperating therewith to effect axial compressive engagement with said seal means when said valve member is in said closed position;

an annular retaining ring disposed concentrically with said body portion axially spaced from said open end;

two circumferentially opposed, generally parallel, axially extending webs interconnecting said retaining ring and body portion, each said web affixed at one end thereof to said retaining ring and at an opposite end thereof to said body portion adjacent said open end; and at least two circumferentially-spaced detents extending inwardly from said operating ring to capture and abutment surface formed on said male member to effect positive engagement of said quick connector and male member.

18. A quick connector adapted for releasable locking engagement with a generally tubular male member defining an outwardly extending abutment flange and an open end, said quick connector comprising:

a generally cylindrical, elongated body portion open at one end for receiving said male member, said body portion defining a through passage registering with said male member open end and interconnecting said body portion said open end and a conduit receiving adapter at an opposite end for the flow of fluid therethrough;

a radially inwardly directed seat carried by said body portion within said through passage facing said conduit receiving adapter;

an annular resilient seal member disposed concentrically within said through passage axially adjacent said seat;

a valve member disposed for axial displacement within said passage from a closed position wherein said valve member, coacting with said seat and seal member closes said through passage to an open position to establish open communication between said body portion open end and said adapter in response to engagement of said body portion and said male member, said valve member defining a radially outwardly extending seating surface disposed axially intermediate said seal member and adapter and facing said body portion open end, said seating surface at least partially radially coextensive with said seat and seal to effect axial compressive engagement with said seal when said valve member is in said closed position;

means for urging said valve member towards said closed position;

means operative, upon locking engagement of said male member and quick connector to displace said valve member from said closed position to said open position;

means for locking said male member and quick connector together in said engaged condition; and means operative to establish a fluid seal between said body portion and said male member, said seal means disposed within said through passage axially intermediate said body portion open end and said seat carried by said body portion, said valve member further comprising a first end portion defining said seating surface and an axially recessed thrust surface for abutting one end of said means for urging valve member, a second end portion slip fit within said through passage axially spaced from said first end portion by a dimension that exceeds a nominal diameter dimension of said through passage, and an elongated link member interconnecting said first and second end portions for simultaneous axial displacement, wherein said second end portion resembles a spoked wheel with said link member joined thereto at an axis of symmetry thereof.

19. A quick connector adapted for releasable locking engagement with a generally tubular male member defining an outwardly extending abutment flange and an open end, said quick connector comprising:

a generally cylindrical, elongated body portion open at one end for receiving said male member, said body portion defining a through passage registering with said male member open end and interconnecting said body portion said open end and a conduit receiving adapter at an opposite end for the flow of fluid therethrough;

a radially inwardly directed seat carried by said body portion within said through passage facing said conduit receiving adapter;

an annular resilient seal member disposed concentrically within said through passage axially adjacent said seat;

a valve member disposed for axial displacement within said passage from a closed position wherein said valve member, coacting with said seat and seal member closes said through passage to an open position to establish open communication between said body portion open end and said adapter in response to engagement of said body portion and said male member, said valve member defining a radially outwardly extending seating surface disposed axially intermediate said seal member and adapter and facing said body portion open end, said seating surface at least partially radially coextensive with said seat and seal to effect axial compressive engagement with said seal when said valve member is in said closed position;

means for urging said valve member towards said closed position;

means operative, upon locking engagement of said male member and quick connector to displace said valve member from said closed position to said open position;

means for locking said male member and quick connector together in said engaged condition; and means operative to establish a fluid seal between said body portion and said male member,, said seal means disposed within said through passage axially intermediate said body portion open end and said seat carried by said body portion, said valve member further comprising a first end portion defining said seating surface and an axially recessed thrust surface for abutting one end of said means for urging valve member, a second end portion slip fit within said through passage axially spaced from said first end portion by a dimension that exceeds a nominal diameter dimension of said through passage, and an elongated link member interconnecting said first and second end portions for simultaneous axial displacement, wherein said elongated link member and second end portion are interconnected through a swivel joint.

* * * * *